(12) United States Patent
Bairanzade et al.

(10) Patent No.: US 7,701,180 B2
(45) Date of Patent: Apr. 20, 2010

(54) DC-TO-DC CONVERTER AND METHOD THEREFOR

(75) Inventors: Michael Bairanzade, Tournefeuille (FR); Remi Gerber, Pins-Justaret (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 397 days.

(21) Appl. No.: 11/576,030

(22) PCT Filed: Jan. 14, 2005

(86) PCT No.: PCT/US2005/001797

§ 371 (c)(1),
(2), (4) Date: Mar. 26, 2007

(87) PCT Pub. No.: WO2006/078244

PCT Pub. Date: Jul. 27, 2006

(65) Prior Publication Data

US 2009/0224743 A1      Sep. 10, 2009

(51) Int. Cl.
*G05F 1/577* (2006.01)

(52) U.S. Cl. .................................................... 323/267
(58) Field of Classification Search ............... 323/265, 323/267, 293; 327/306, 536, 537; 307/108, 307/110; 320/121, 166
See application file for complete search history.

(56) References Cited

U.S. PATENT DOCUMENTS

| | | | | |
|---|---|---|---|---|
| 5,581,454 A * | 12/1996 | Collins | ....................... | 363/59 |
| 6,055,168 A * | 4/2000 | Kotowski et al. | ............... | 363/60 |
| 6,323,623 B1 * | 11/2001 | Someya et al. | ............... | 320/166 |
| 6,717,458 B1 * | 4/2004 | Potanin | ...................... | 327/536 |
| 6,834,001 B2 * | 12/2004 | Myono | ........................ | 363/60 |
| 7,190,210 B2 * | 3/2007 | Azrai et al. | .................. | 327/536 |
| 7,301,250 B2 * | 11/2007 | Cassel | ........................ | 307/106 |

* cited by examiner

*Primary Examiner*—Adolf Berhane
(74) *Attorney, Agent, or Firm*—Robert F. Hightower

(57) ABSTRACT

In one embodiment a switched capacitor dc-dc converter uses the load current to assist in determining a supply configuration to use to form the output voltage.

14 Claims, 4 Drawing Sheets

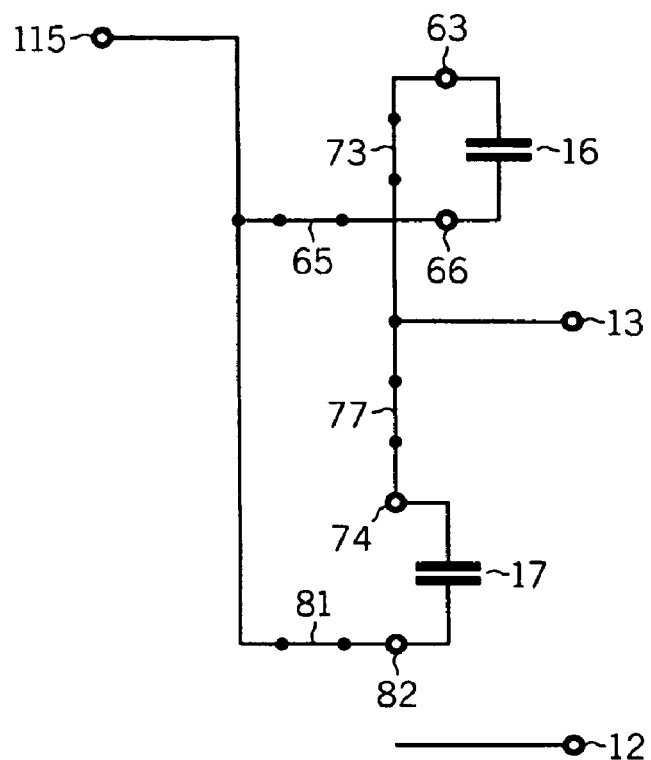
FIG. 7
FIG. 8
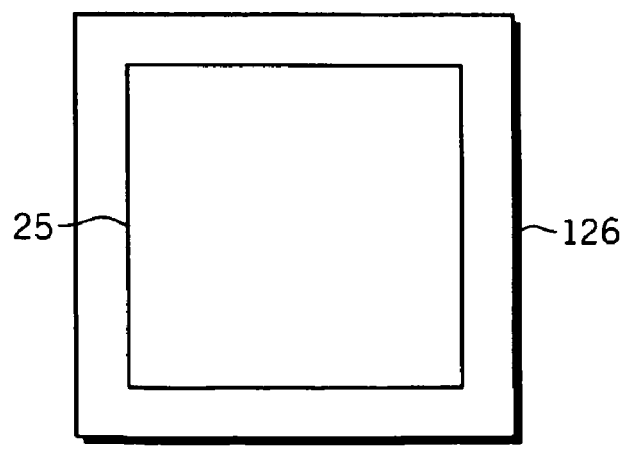

US 7,701,180 B2

DC-TO-DC CONVERTER AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to produce dc-to-dc converters. A switched capacitor dc-to-dc converter was a particular implementation that was used in low load current applications. One example of such a dc-to-dc converter was an LM3352 that was sold by National Semiconductor of Santa Clara Calif. One problem with these previous switched capacitor dc-to-dc converters was noise. Typically, if the output voltage was higher than a desired output voltage value the converter stopped regulating the output voltage until the output voltage decreased back to the desired value. Alternating between regulating and not regulating the output voltage resulted in noise that was coupled to the output voltage.

Accordingly, it is desirable to have a dc-to-dc converter that maintains regulation of the output voltage, that improves efficiency, and that reduces noise coupled to the output voltage.

BRIEF DESCRIPTION OF THE DRAWINGS

FIG. 7 schematically illustrates an embodiment of a third supply configuration in accordance with the present invention; and FIG. 8 schematically illustrates an enlarged plan view of a semiconductor device that includes the switched capacitor dc-to-dc controller of FIG. 1 in accordance with the present invention.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
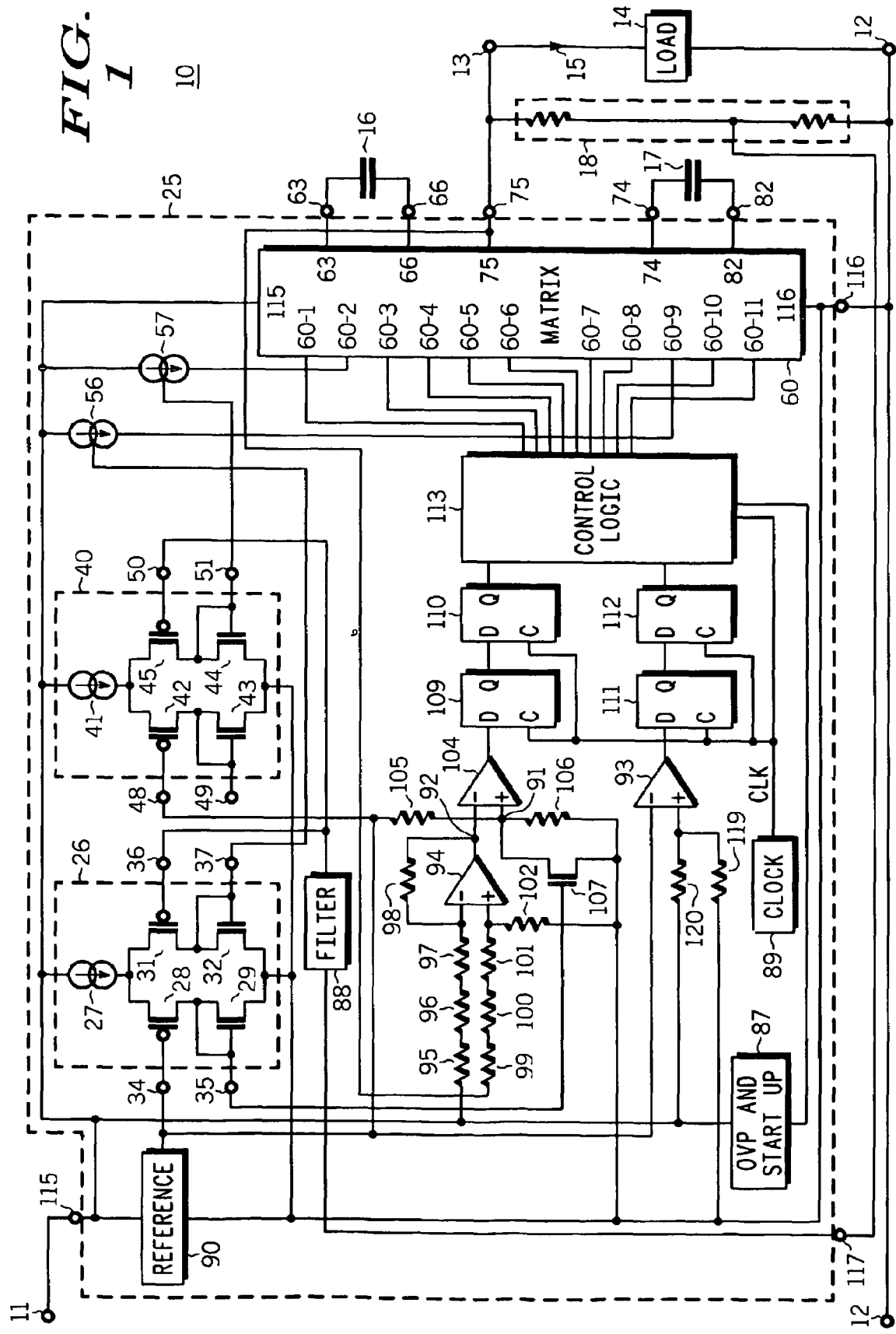
FIG. 1 schematically illustrates an embodiment of a portion of a power supply control system that includes a switched capacitor dc-to-dc controller in accordance with the present invention.

FIG. 1 schematically illustrates an embodiment of a portion of a power supply control system 10 that includes a switched capacitor dc-to-dc controller 25. Controller 25 is configured to operably increase the efficiency and reduce the noise of system 10. System 10 receives an input voltage, such as a battery or other dc voltage, between a voltage input 11 and a voltage return 12 and produces an output voltage between an output 13 and return 12. System 10 also includes a load 14, a first switched capacitor 16, a second switched capacitor 17, and a feedback network 18 that is utilized provide a feedback (FB) signal that is representative of the value of the output voltage between output 13 and return 12. In the preferred embodiment, feedback network 18 is a resistor divider but may be other well known feedback networks in other embodiments. Controller 25 receives the feedback (FB) signal on a feedback input 117. Controller 25 receives the input voltage between a voltage input 115 and a voltage return 116 that typically are connected to input 11 and return 12, respectively.

Controller 25 includes a switch matrix 60, charging current sources 56 and 57, current control amplifiers 26 and 40, a voltage status amplifier 94, an input voltage comparator 93, a regulation comparator 104, storage elements configured as D type flip-flops 109, 110, 111, and 112, a clock generator or clock 89, a block of control logic 113, an internal reference generator or reference 90, a frequency compensation filter 88, and an over-voltage protection (OVP) and start-up control block 87. Block 87 typically has over-voltage and start-up protection circuits that are well known to those skilled in the art. Frequency compensation filter 88 typically is used to provide stability to the control loop of amplifiers 26 and 40, matrix 60, capacitors 16 and 17, and feedback network 18. Reference 90 is connected between input 115 and return 116 in order to receive the input voltage and form a reference voltage on an output of reference 90. Although illustrated as a single block, reference 96 may be comprised of several sections such as a band-gap reference section and buffers or translators that prevent the band-gap section from being affected by the circuits that receive the reference voltage. In most embodiments, controller 25 also includes an internal regulator (not shown) that provides an internal operating voltage for elements of controller 25 such as amplifier 94, comparators 93 and 104, and logic 113. The internal regulator typically is an integrating regulator that forms the internal operating voltage to be approximately equal to the value of the voltage on input 115. Amplifier 26 includes a current source 27 that is connected to receive the input voltage and supply a current to differential connected transistors 28, 29, 31, and 32. Similarly, amplifier 40 includes a current source 41 that is connected to receive the input voltage and supply current to differential connected transistors 42, 43, 44, and 45.

Figure 2:
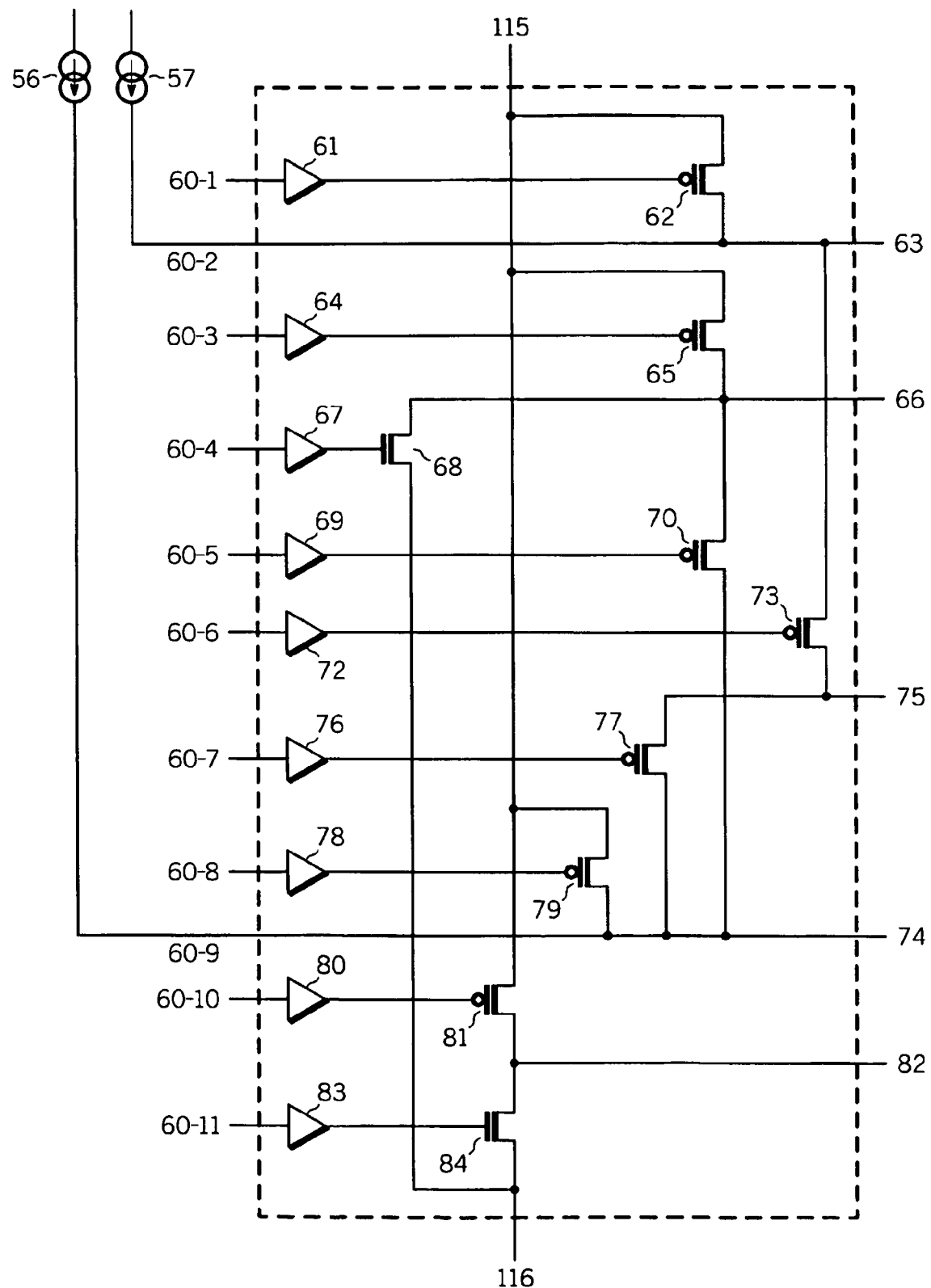
FIG. 2 schematically illustrates an embodiment of a portion of the switched capacitor dc-to-dc controller of FIG. 1 in accordance with the present invention.

FIG. 2 schematically illustrates an embodiment of a portion of matrix 60 that was explained in the description of FIG. 1. This description includes references to FIG. 1 and FIG. 2. FIG. 2 illustrates one embodiment of a configuration of matrix 60, although other embodiments are possible. Controller 25 controls matrix 60 in order to provide different charging configurations and supply configurations of capacitors 16 and 17. Matrix 60 includes transistor drivers 61, 64, 67, 69, 72, 76, 78, 80, and 83 that are connected to drive respective switch transistors 62, 65, 68, 70, 73, 77, 79, 81, and 84 to perform the configuration of capacitors 16 and 17. Capacitor 16 is connected between a first capacitor terminal 63 and a second capacitor terminal 66 of controller 25 and capacitor 17 is connected between a third capacitor terminal 74 and a fourth capacitor terminal 82 of controller 25.

Clock 89 generates a multiphase clock signal (CLK) that is received by logic 113 and flip-flops 109, 110, 111, and 112 in order to synchronize the operation of controller 25. In the preferred embodiment, CLK has an approximately 50-50 duty cycle and preferably is high to form a first phase and is low to form a second phase. During at least a portion of the first phase, control logic 113 controls matrix 60 to couple capacitors 16 and 17 in the charging configuration. During at least a portion of the second phase, logic 113 controls matrix 60 to connect capacitors 16 and 17 in the supply configuration to supply the desired output voltage between output 13 and return 12 and to supply a load current 15 to load 14. In the preferred embodiment, controller 25 has three operating modes and control logic 113 has three corresponding charging configurations and three supply configurations that are encoded by the Q outputs of flip-flops 110 and 112. Theses three operating modes are referred to hereinafter as a 1× mode, a 1.5× mode, and a 2× mode. As will be seen hereinafter, the 1.5× and 2.× modes may be referred to as boost modes since they boost the value of the voltage used to form the desired output voltage. The description hereinafter refers to these three modes in order to facilitate the explanation, however, those skilled in the art realize that controller 25 may be formed to operate in more or less than three operating modes. If the input voltage is no less than approximately a desired value of the output voltage, represented by the value of the reference voltage, controller 25 operates in the 1× mode. If the value of the input voltage decreases below the desired output voltage value and if the difference between the input voltage and the output voltage is no less than a first value, represented by the value of a load current modulated reference voltage, controller 25 operates in the 1.5× mode. If the value of the input voltage is less than the desired output voltage value and if the difference between the input voltage and the output voltage is greater than the first value, controller 25 operates in the 2× mode. The load current modulated reference voltage will be explained further hereinafter.

Amplifiers 26 and 40 are formed to provide a current control signal to control the amount of current supplied by respective sources 56 and 57 to respective capacitors 16 and 17 during the charging configuration. The charging current of sources 56 and 57 is used to place a charge on respective capacitors 16 and 17 during this first CLK phase. Amplifiers 26 and 40 receive the feedback (FB) signal from filter 88 on respective FB inputs 36 and 50, receive the reference signal on respective inputs 34 and 48, and responsively form the respective current control signal. If the FB signal is greater than the reference signal, the value of current 15 required by load 14 is greater than the current used to charge capacitors 16 and 17, thus, the charging current should be increased. In such a case, transistor 31 conducts more current than transistor 28 and output 37 has a higher voltage than output 35. Charging current source 56 receives the current control signal on output 37 and increases the current supplied by source 56. Similarly for amplifier 40, transistor 45 conducts more current than transistor 42 and output 51 has a higher voltage than output 49. Charging current source 57 receives the current control signal on output 51 and increases the current supplied by source 57. Thus, the current control signals are representative of the value of the charging current used to charge capacitors 16 and 17, and are also representative of load current 15. Amplifiers 26 and 40 also are formed to generate a reference control signal on respective reference control outputs 35 and 49. The value of the reference control signal on outputs 35 and 49 is representative of load current 15.

Amplifier 94 and comparators 93 and 104 are configured to assist in forming the state control word that is used by logic 113 to determine the operating modes used for the charging and supply configurations. Comparator 93 receives a signal representative of the input voltage on a non-inverting input and receives the reference voltage on an inverting input. Resistors 120 and 119 form a resistor divider to reduce the value of the input voltage to a value that can be used by comparator 93. Thus, comparator 93 compares the input voltage to the desired value of the output voltage represented by the reference voltage. A high value on the output of comparator 93 indicates that the input voltage is greater than the desired value of the output voltage, thus, a non-boost mode should be used for the charging and supply configurations. A low value indicates that the input voltage is less than the desired value of the output voltage, thus, a boost mode should be used for the operating mode of the charging and supply configurations. Amplifier 94 receives a signal that is representative of the input voltage on an inverting input, a signal that is representative of the output voltage on a non-inverting input, and responsively forms an output signal representing the difference between the input voltage and the output voltage. Thus, the output signal on an output 92 of amplifier 94 represents the value of the output voltage minus the value of the input voltage (Vout−Vin). In the preferred embodiment, resistors 95, 96, and 97 divide the value of the input voltage by three (3) and resistors 99, 100, and 101 divide the value of the output voltage by three (3) in order to keep the signals applied to amplifier 94 in a voltage range that is suitable for use by amplifier 94. Resistors 98 and 102 fix the gain of the signals applied to amplifier 94. In the preferred embodiment, resistors 95-102 all have the same value, thus, output 92 represents ((Vout−Vin)/3).

Comparator 104 receives the output of amplifier 94 and compares it to a signal that is representative of the value of the reference voltage modulated by the value of load current 15. Resistors 105 and 106 along with a modulation transistor 107 provide one embodiment of a circuit that facilitates using the value of load current 15 to assist in controlling the operating mode of controller 25. Modulation transistor 107 receives the reference control signal on output 35 and modulates the value of the divided reference voltage responsively to the value of load current 15. If load current 15 is high, output 35 of amplifier 26 is low and the current conducted by transistor 107 is low so that the voltage formed on a node 91 and received on the non-inverting input of comparator 104 is close to the divided reference voltage value. Thus, the output of comparator 104 goes high if output 92 of amplifier 94 indicates a large difference between Vin and Vout and a high load current. Such a condition indicates that power is being lost in matrix 60. It can be appreciated that the voltage dropped across transistors 62, 65, 68, 70, 73, 77, 79, 81, and 84 during the supply configuration affects the efficiency of controller 25 and system 10. The current supplied by sources 56 and 57 multiplied by the voltage dropped across transistors 62, 65, 68, 70, 73, 77, 79, 81, and 84 represents a power loss. Since, the output voltage has to be much larger than the input voltage to force the output of comparator 104 high, a larger boost mode should be used for the charging and supply configurations. This can be represented by ((V91>((Vout−Vin)/3)) where V91 is the portion of the reference voltage received on node 91 and received on the non-inverting input of comparator 104 after it is modulated by the value of load current 15. In the preferred embodiment, controller 25 uses the 2× mode. If load current 15 is low, output 35 of amplifier 26 is high and the current conducted by transistor 107 is high so that the voltage received on the non-inverting input is less than the divided reference voltage value. Since, a smaller difference between the output voltage and the input voltage can force the output of comparator 104 high, a smaller boost mode should be used for the charging and supply configurations. This condition represents a smaller power loss. The output of comparator 104 for this condition can be represented by ((V91>((Vout−Vin)/3)) where V91 is the portion of the reference voltage received on the non-inverting input of comparator 104 after it is modulated by the value of load current 15. In the preferred embodiment, controller 25 uses the 1.5× mode. This condition represents a smaller power loss. Consequently the value of load current 15 is used to control the output of comparator 104 and the operating mode of controller 25. It can be seen that using the value of load current 15 to set the operating mode minimizes the power loss and improves the efficiency by increasing the value of the voltage generated by matrix 60.

The output of comparator 104 is stored in flip-flop 109 on the rising edge of the second phase of the CLK signal, and the Q output of flip-flop 109 is stored in flip-flop 110. Similarly, the output of comparator 93 is stored into flip-flop 111 on the same rising edge and the Q output of flip-flop 111 is stored in flip-flop 112. Note that two flip-flops are configured in series to prevent hold time violations on the inputs to flip-flops 109-112.

Also during the first CLK phase, logic 113 receives the output of flip-flops 110 and 112, decodes the state word formed thereby, and responsively configures capacitors 16 and 17 in a charging configuration to either both be charged to a voltage approximately equal to the input voltage or to both be charged to a voltage approximately equal to one-half of the input voltage. Capacitors 16 and 17 are coupled to charging current sources 56 and 57 so that sources 56 and 57 can apply an amount of charge that is controlled by amplifiers 26 and 40. Since there are two capacitors, capacitors 16 and 17 can either be connected in parallel so that the input voltage is applied to each capacitor or be connected in series so that the input voltage is divided between capacitors 16 and 17. Control logic 113 decodes the state word of flip-flops 110 and 112 to determine the operating mode and which one of these two configurations to use in charging capacitors 16 and 17. The state of the Q outputs of flip-flops 110 and 112 verses the operating mode used for the charging and supply configurations and the corresponding state of transistors 62, 65, 68, 70, 73, 77, 79, 81, and 84 is illustrated in table 1.

| Tran-sis-tors | Q110 & Q112 = 1, 1 1X Mode | | Q110 & Q112 = 1, 0 1.5X Mode | | Q110 & Q112 = 0, 0 2X Mode | |
|---|---|---|---|---|---|---|
| | Charging | Supply | Charging | Supply | Charging | Supply |
| 62 | ON | OFF | ON | OFF | ON | OFF |
| 65 | OFF | OFF | OFF | ON | OFF | ON |
| 68 | ON | ON | OFF | OFF | ON | OFF |
| 70 | OFF | OFF | ON | OFF | OFF | OFF |
| 73 | OFF | ON | OFF | ON | OFF | ON |
| 77 | OFF | ON | OFF | ON | OFF | ON |
| 79 | ON | OFF | OFF | OFF | ON | OFF |
| 81 | OFF | OFF | OFF | ON | OFF | ON |
| 84 | ON | ON | ON | OFF | ON | OFF |

Figure 3:
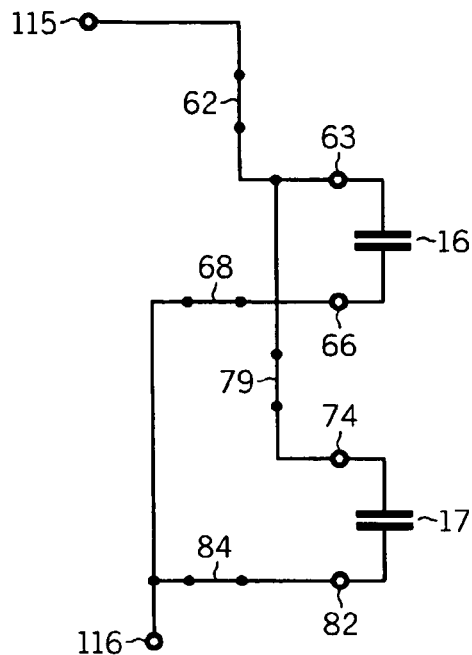
FIG. 3 schematically illustrates an embodiment of a charging configuration in accordance with the present invention.
Figure 4:
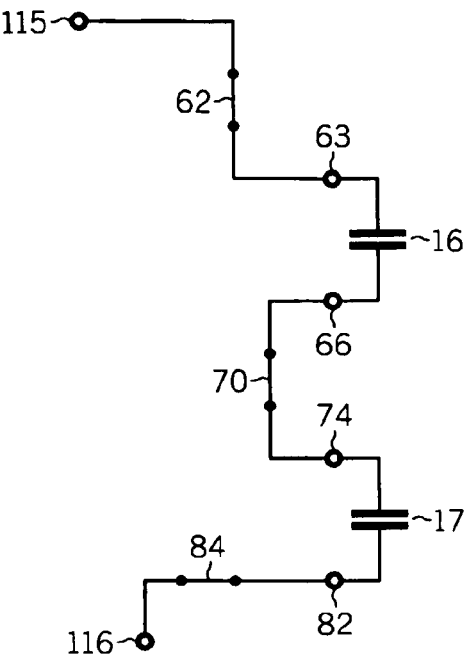
FIG. 4 schematically illustrates an embodiment of another charging configuration in accordance with the present invention.

FIG. 3 and FIG. 4 schematically illustrate a portion of an embodiment of two charging configurations of capacitors 16 and 17 that are formed by controller 25.

Figure 5:
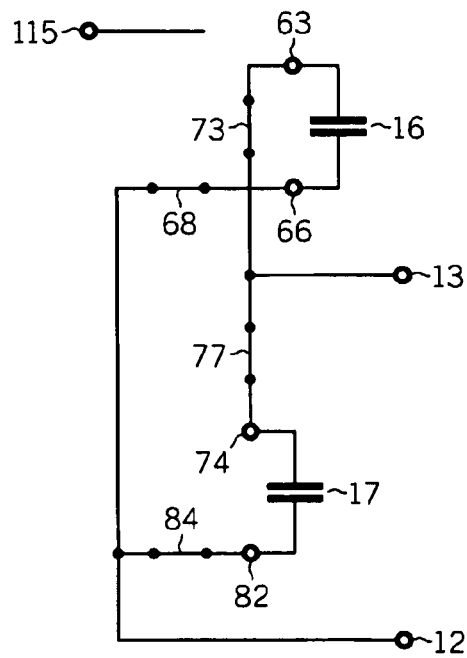
FIG. 5 schematically illustrates an embodiment of a supply configuration in accordance with the present invention.
Figure 6:
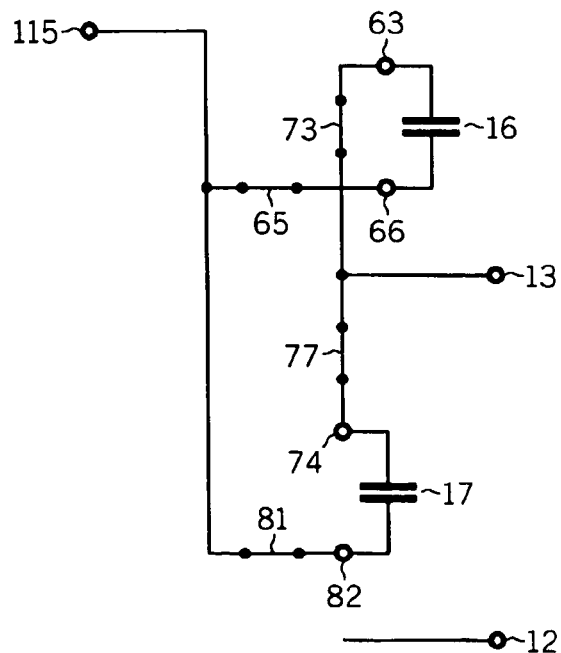
FIG. 6 schematically illustrates an embodiment of a second supply configuration in accordance with the present invention.

FIG. 5 through FIG. 7 schematically illustrate a portion of an embodiment of three supply configurations of capacitors 16 and 17 that are formed by controller 25. This description has references to FIG. 1-FIG. 7. If flip-flops 110 and 112 are high, the input voltage is at least equal to the desired output voltage, thus, capacitors 16 and 17 will be used to supply the output voltage during the supply configuration. In order to accomplish the supply configuration, logic 113 enables transistors 62, 68, 79, and 84 so that capacitors 16 and 17 are charged to the value the input voltage during the charging configuration. Additionally sources 56 and 57 are controlled to form a charge on capacitors 16 and 17 so that capacitors 16 and 17 may supply a sufficient value of load current 15 that is required by load 14. This charging configuration is illustrated in table 1 and FIG. 3. If flip-flop 110 is high and flip-flop 112 is low then the input voltage is less than the desired value of the output voltage and the input voltage must be boosted by approximately one-half of the value of the input voltage in order to achieve the desired output voltage. Consequently, logic 113 enables transistors 62, 70, and 84 so that capacitors 16 and 17 will be connected in series to receive the input voltage, and each capacitor is charged to approximately one-half of the input voltage. Additionally sources 56 and 57 are controlled to form a charge on capacitors 16 and 17 so that capacitors 16 and 17 may supply a sufficient current for load current 15. This charging connection is illustrated in FIG. 4.

If flip-flop 110 is low and flip-flop 112 is low then the input voltage is much less than the desired value of the output voltage and the input voltage must be boosted by approximately the value of the input voltage in order to achieve the desired output voltage. Consequently, logic 113 once again enables transistors 62, 68, 79, and 84 so that capacitors 16 and 17 will be connected in parallel to receive the input voltage and each capacitor is charged to approximately the input voltage. Additionally sources 56 and 57 are controlled to form a charge on capacitors 16 and 17 so that capacitors 16 and 17 may supply a sufficient value for load current 15. This charging connection is illustrated in FIG. 3.

Subsequently, CLK goes high for the second CLK phase. The rising edge of CLK stores the output of flip-flops 109 and 111 into respective flip-flops 110 and 112 and stores the output of comparators 104 and 93 into respective flip-flops 109 and 111. Logic 113 receives CLK and responsively switches to the supply mode. Logic 113 decodes the Q outputs of flip-flops 110 and 112 to control transistors 62, 65, 68, 70, 73, 77, 79, 81, and 84 to couple capacitors 16 and 17 in the respective supply configuration as show in table 1. If the Q output of flip-flops 110 and 112 are both high, the input voltage is no less than the desired output voltage and the voltage stored on capacitors 16 and 17 is sufficient to provide the desired value of the output voltage. Thus, logic 113 enables transistors 68, 73, 77, and 84 to couple capacitors 16 and 17 in parallel with each other and in parallel with output 13 and return 12 as illustrated in FIG. 5. If the Q output of flip-flop 110 is high and flip-flop 112 is low the input voltage is less than the desired output voltage and the input voltage must be boosted to achieve the desired output voltage. Thus, logic 113 enables transistors 65, 73, 77, and 81 to couple capacitors 16 and 17 in parallel with each other and in series with the input voltage in order to form the output voltage between output 13 and return 12 as illustrated in FIG. 6. In this mode, capacitors 16 and 17 are charge to one-half the value of the input voltage, so the output voltage is approximately one and one-half times (1.5×) the input voltage. If the output of flip-flops 110 and 112 are low, the input voltage is much less than the desired value of the output voltage and the input voltage must be boosted even more. Consequently, both capacitors 16 and 17 are again connected together in series and in series with the input voltage to form an output voltage that is approximately two times (2×) the value of the input voltage. Logic 113 enables transistors 65, 73, 77, and 81 to achieve this supply configuration as illustrated in FIG. 7.

It can be appreciated that using the value of load current 15 to set the operating mode minimizes the power loss. For example, suppose the desired output voltage is five volts (5.0V). Typically the desired value has a tolerance of about five percent so the desired value is about 4.75V to 5.25V. If the input voltage is greater than or equal to five volts, controller 25 operates in the 1× mode and the corresponding output voltage is regulated to approximately five volts. This keeps the voltage dropped across transistors 62, 65, 68, 70, 73, 77, 79, 81, and 84 low, thus, the power loss is low. If the input voltage decreases to a value that is less than 4.75 volts (for example between about 4.0 and 4.75 volts), controller operates in the 1.5× mode and the corresponding output voltage is regulated to approximately five volts. This also keeps the voltage dropped across transistors 62, 65, 68, 70, 73, 77, 79, 81, and 84 low, thus, the power loss is low. If the input voltage decreases to a value that is less than about one-half of the maximum value (for example about one half of 5.25 volts or approximately 2.7 volts), controller operates in the in the 2× mode and the corresponding output voltage is regulated to approximately five volts. This also keeps the voltage dropped across transistors 62, 65, 68, 70, 73, 77, 79, 81, and 84 low, thus, the power loss is low.

In order to facilitate the functionality described herein, reference 90 is connected between input 115 and return 116, and the output of reference 90 is commonly connected to input 34 of amplifier 26, input 48 of amplifier 40, the inverting input of comparator 93, and a first terminal of resistor 105. A second terminal of resistor 105 is commonly connected to a non-inverting input of comparator 104, a drain of transistor 107, and a first terminal of resistor 106. A second terminal of resistor 106 is commonly connected to a source of transistor 107, a first terminal of resistor 102, and return 116. A gate of transistor 107 is connected to output 35 of amplifier 26. A second terminal of resistor 102 is connected to the non-inverting input of amplifier 94 and to a first terminal of resistor 101 which has a second terminal connected to a first terminal of resistor 100. A second terminal of resistor 100 is connected to a first terminal of resistor 99 which has a second terminal connected to output 75 of controller 25. An inverting input of amplifier 94 is connected to a first terminal of resistor 97 and to a first terminal of resistor 98 which has a second terminal connected to output 92 and to a non-inverting input of comparator 104. A second terminal of resistor 97 is connected to a first terminal of resistor 96 which has a second terminal connected to a first terminal of resistor 95. The second terminal of resistor 95 is connected to input 115 and to a first terminal of resistor 120. A second terminal of resistor 120 is commonly connected to a first terminal of resistor 119 and a non-inverting input of comparator 93. A second terminal of resistor 119 is connected to return when 16. The output of comparator 93 is connected to the D input of flip-flop 111. A clock input of flip-flop 111 is commonly connected to a clock input of flip-flops 109, 110, and 112, the CLK output of clock 89, and to a clock input of logic 113. A Q output of flip-flop 111 is connected to a D input of flip-flop 112 which has a Q output connected to a first input of logic 113. The output of comparator 104 is connected to a D input of flip-flop 109 which has a Q output connected to a D input of flip-flop 110. Flip-flop 110 has a Q output connected to a second input of logic 113. Current source 27 of amplifier 26 has a first terminal connected to input 115 and a second terminal commonly connected to the source of transistors 28 and 31. A gate of transistor 28 is connected to input 34 and a drain is commonly connected to a drain and gate of transistor 29, and output 35. A source of transistor 29 is commonly connected to return 116 and a source of transistor 32. A gate of transistor 32 is commonly connected to output 37, a drain of transistor 32, a drain of transistor 31, and a control input of current source 56. A gate of transistor 31 is commonly connected to input 36, the output of filter 88, and input 50 of amplifier 40. Current source 41 of amplifier 40 has a first terminal connected to input 115 and a second terminal commonly connected to the source of transistors 42 and 45. A gate of transistor 42 is connected to input 48 and a drain is commonly connected to output 49 and to a gate and drain of transistor 43. A source of transistor 43 is commonly connected to return 116 and the source of transistor 44. A gate of transistor 44 is commonly connected to a drain of transistor 44, a drain of transistor 45, output 51, and a control input of current source 57. A gate of transistor 45 is connected to input 50. An input of filter 88 is connected to input 117. A first terminal of current source 56 is connected to input 115 and second terminal is commonly connected to terminal 74, a drain of transistor 70, and a drain of transistor 77, and a drain of transistor 79. A first terminal of current source 57 is connected to input 115 and a second terminal is commonly connected to terminal 63, a drain of transistor 62, and a drain of transistor 73. A source of transistor 62 is commonly connected to input 115, the source of transistor 65, the source of transistor 79, and a source of transistor 81. A gate of transistor 62 is connected to an output of driver 61 which has an input connected to a first output of logic 113. A drain of transistor 65 is commonly connected to terminal 66, a source of transistor 70, and a source of transistor 68. A gate of transistor 65 is connected to an output of driver 64 which has an input connected to a second output a logic 113. A drain of transistor 68 is connected to return 116 and a gate of transistor 68 is connected to an output of driver 67 which has an input connected to a third output of logic 113. A gate of transistor 70 is connected to an output of driver 69 and an input of driver 69 is connected to a 4 output of logic 113. A drain of transistor 73 connected to output 75 and a gate is connected to an output of driver 72. An input of driver 72 is connected to a fifth output of logic 113. A source of transistor 77 is connected to output 75 and a gate is connected to an output of driver 76. An input of driver 76 is connected to a sixth output of logic 113. A gate of transistor 79 is connected to an output of driver 78 which has an input connected to a seventh output of logic 113. A drain of transistor 81 is commonly connected to terminal 82 and a drain of transistor 84. A gate of transistor 81 is connected to an output of driver 80 which has an input connected to an eighth output of logic 113. A source of transistor 84 is connected to return 116 and a gate is connected to an output of driver 83. An input of driver 83 is connected to a ninth output of logic 113. Terminal 63 of controller 25 is connected to a first terminal of capacitor 16 which has a second terminal connected to terminal 66. A first terminal of capacitor 17 is connected to input 74 and a second terminal is connected to terminal 82. Output 75 is connected to output 13, to a first terminal of network 18, and to a first terminal of load 14. A second terminal of load 14 is commonly connected to return 12, a second terminal of network 18, and return 116. Block 87 is connected between input 115 and return 116 in order to receive the input voltage, and has an output connected to a third input of logic 113.

FIG. 8 schematically illustrates an enlarged plan view of a portion of an embodiment of a semiconductor device 125 that is formed on a semiconductor die 126. Controller 25 is formed on die 126b. Die 126 may also include other circuits that are not shown in FIG. 8 for simplicity of the drawing. Controller 25 and device 125 are formed on die 126 by semiconductor manufacturing techniques that are well known to those skilled in the art.

In view of all of the above, it is evident that a novel device and method is disclosed. Included, among other features, is forming a switched capacitor dc-dc controller to use the value of the load current in addition to the value of the input voltage and the output voltage to determine the amount of charge to apply to the switched capacitors in addition to determine the voltage to which the capacitors are to be charged. Using the load current is set the charging and supply configurations increases the efficiency of the system that uses controller 25.

While the invention is described with specific preferred embodiments, it is evident that many alternatives and variations will be apparent to those skilled in the semiconductor arts. More specifically the invention has been described for an amplifier circuit and charging current source that controls the charging current. Other amplifier configurations and current source configurations may be used as long as the value of the load current is used to assist in determining the charging current and to assist in determining the charging and supply configurations of the switched capacitors. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of operating a switched capacitor dc-dc converter comprising:
    configuring the converter to selectively control a charging configuration and a supply configuration of a plurality of capacitors responsively to a value of a charging current, an input voltage, and an output voltage;
    configuring the converter to set the value of the charging current responsively to the value of the output voltage, and
    configuring the converter to use the value of the charging current to modulate a reference voltage used to form the charging configuration and the supply configuration including configuring the converter to form a reference control signal that is representative of a current control signal and to use the current control signal to modulate the reference voltage.

2. The method of claim 1 wherein configuring the converter to selectively control the charging configuration includes coupling the plurality of capacitors in series or parallel to receive the input voltage responsively to the value of the charging current, the input voltage, and the output voltage.

3. The method of claim 1 further including subtracting the output voltage from the input voltage and comparing a difference between the output voltage and the input voltage to the reference voltage that is modulated by the value of the charging current.

4. The method of claim 1 further including coupling the plurality of capacitors in the charging configuration during a first time period and in the supply configuration during a second time period.

5. A method of forming a switched capacitor dc-dc converter comprising:
    configuring the converter to selectively set an operating state responsively to a value of a charging current, an input voltage, and an output voltage;
    configuring the converter to receive the output voltage and responsively form the charging current including configuring the converter to receive the output voltage and responsively form a first charging current to charge a first capacitor of a plurality of capacitors during at least a portion of a first time period; and
    configuring the converter to selectively couple the plurality of capacitors together during at least a portion of a second time period to form the output voltage.

6. The method of claim 5 wherein configuring the converter to selectively set the operating state includes configuring the converter to set the charging configuration and the supply configuration responsively to the value of the charging current, the input voltage, and the output voltage.

7. The method of claim 5 wherein configuring the converter to selectively set the operating state includes configuring the converter to selectively set the operating state in a storage element.

8. The method of claim 5 wherein configuring the converter to receive the output voltage and responsively form the charging current includes configuring the converter to couple the plurality of capacitors in the charging configuration to receive the input voltage responsively to the value of the charging current.

9. The method of claim 5 wherein configuring the converter to selectively set the operating state includes configuring the converter to modulate the value of the reference signal responsively to the value of the charging current and responsively set the operating state.

10. A switched capacitor dc-dc converter comprising:
    a state circuit operably coupled to set an operating state of the converter responsively to a value of a charging current, an input voltage, and an output voltage wherein the charging current is used to charge a plurality of capacitors to a voltage; and
    a modulation circuit configured to modulate a value of a reference signal responsively to the value of the charging current and wherein the state circuit uses the modulated value of the reference signal to form a charging configuration and a supply configuration of the plurality of capacitors.

11. The converter of claim 10 further including control logic coupled to receive the operating state and responsively control a switch matrix to couple the plurality of capacitors in the charging configuration to receive the input voltage during a first time period and to responsively control the switch matrix to couple the plurality of capacitors in the supply configuration to form the output voltage during a second time period.

12. The converter of claim 10 wherein the current control circuit is coupled to receive the input voltage and responsively form a current control signal operably coupled to control the charging current to charge a capacitor of the plurality of capacitors.

13. The converter of claim 12 wherein the current control circuit includes an amplifier coupled to form the current control signal and to form a reference control signal that is representative of the charging current.

14. The converter of claim 10 wherein the state circuit includes a memory circuit coupled to store the operating state of the converter.

* * * * *